(12) United States Patent
Daniel

(10) Patent No.: US 9,710,826 B1
(45) Date of Patent: Jul. 18, 2017

(54) SYSTEM AND METHOD OF ADVERTISING A PLURALITY OF VARIED MULTIMEDIA CONTENT

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 307 days.

(21) Appl. No.: 14/522,410

(22) Filed: Oct. 23, 2014

Related U.S. Application Data

(63) Continuation-in-part of application No. 14/025,585, filed on Sep. 12, 2013, and a continuation-in-part of application No. 13/975,103, filed on Aug. 23, 2013, and a continuation-in-part of application No. 14/045,628, filed on Oct. 3, 2013, and a continuation-in-part of application No. 14/292,555, filed on May 30, 2014.

(60) Provisional application No. 61/894,731, filed on Oct. 23, 2013.

(51) Int. Cl.
*G06Q 30/02* (2012.01)
*G06K 7/14* (2006.01)
*G06K 19/06* (2006.01)

(52) U.S. Cl.
CPC ....... *G06Q 30/0257* (2013.01); *G06K 7/1417* (2013.01); *G06K 19/06037* (2013.01); *G06K 19/06103* (2013.01); *G06Q 30/0267* (2013.01)

(58) Field of Classification Search
IPC ............... G06Q 30/0241,30/0257, 30/0267
See application file for complete search history.

(56) References Cited

U.S. PATENT DOCUMENTS 5,691,527 A * 11/1997 Hara .................... G06K 7/1093
235/456
6,266,684 B1 * 7/2001 Kraus ..................... G06F 17/24
715/209

* cited by examiner

*Primary Examiner* — William Spieler
(74) *Attorney, Agent, or Firm* — Alberto Interian, III, Esq.

(57) ABSTRACT

The present invention relates generally to a system and method of providing for the displaying of third-party multimedia advertising content and controlling the review of at least one multimedia content file using an interactive advertising application program configured for use on a mobile device. The application program is configured for scanning an encoded image framed by an interactive frame with at least one embedded hyperlink or icon within, which activates the at least one embedded hyperlink or icon, and upon activation, the at least one encoded image with an icon may be used for accessing and controlling the review of the at least one multimedia content file. However, prior to the displaying of the at least one multimedia content file, the third-party multimedia advertising content may be displayed, thereby allowing for a revenue generating for all third-party multimedia advertising content displayed.

22 Claims, 14 Drawing Sheets

SYSTEM AND METHOD OF ADVERTISING A PLURALITY OF VARIED MULTIMEDIA CONTENT

PRIORITY CLAIM

This patent application is a Continuation-in-Part patent application and claims priority under 35 U.S.C. §119(e), to U.S. Provisional Patent Application Ser. No. 61/894,731 titled "System and Method of Advertising a Plurality of Multimedia Content" filed Oct. 23, 2013; and U.S. Non-Provisional patent application Ser. No. 14/025,585 titled "A System and Method of Advertising Using Multimedia Content" filed Sep. 12, 2013; U.S. Non-Provisional Continuation In Part patent application Ser. No. 13/975,103 titled "System And Method For Optimizing Advertising Content Display For Advanced Searches" filed Aug. 23, 2013; U.S. Non-Provisional Continuation In Part patent application Ser. No. 14/045,628 titled "A System And Method Of Controlling Display Of Multimedia Advertising Content" filed Oct. 3, 2013; and U.S. Non-Provisional patent application Ser. No. 14/292,555 titled "A System and Method of Providing for the Creation of Interactive Advertisements" filed May 30, 2014. The entire disclosures of the afore-mentioned patent applications are incorporated by reference as if fully stated herein.

FIELD OF THE INVENTION

The present invention relates generally to a system and method of providing for the displaying of third-party multimedia advertising content and controlling the review of at least one multimedia content file using an interactive advertising application program configured for use on a mobile device. The application program is configured for scanning an encoded image framed by an interactive frame with at least one embedded hyperlink or icon within, which activates the at least one embedded hyperlink or icon, and upon activation, the at least one encoded image with an icon may be used for accessing and controlling the review of the at least one multimedia content file. However, prior to displaying the at least one multimedia content file, the third-party multimedia advertising content may be displayed, thereby allowing for a revenue generation for all third-party multimedia advertising content displayed.

DESCRIPTION OF THE PRIOR ART

In today's age where we are constantly bombarded with all types of advertisements, e.g. television commercials, radio advertisements, print advertisements in newspapers and magazines, online advertisements that reach your "Inbox" or appear as pop-ups and banners, text messages automatically sent to your mobile phone, we generally filter and most often disregard information received from multiple platforms as it creates cyber clutter. This holds true for all types of marketing, whether for restaurants, airline tickets, subscriptions, insurance and/or financial products. Thus there needs to be an efficient system and method for businesses to market and promote their products and promotions, etc., in a manner that will be well received and reviewed by the general public.

Additionally, in a high tech society where marketing relies heavily on visual presentations, business owners are constantly looking for ways to market their products and services in new and novel manner. This invention satisfies these long felt needs in a new and novel manner and solves the foregoing problems that the prior art has been unable to resolve.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1:
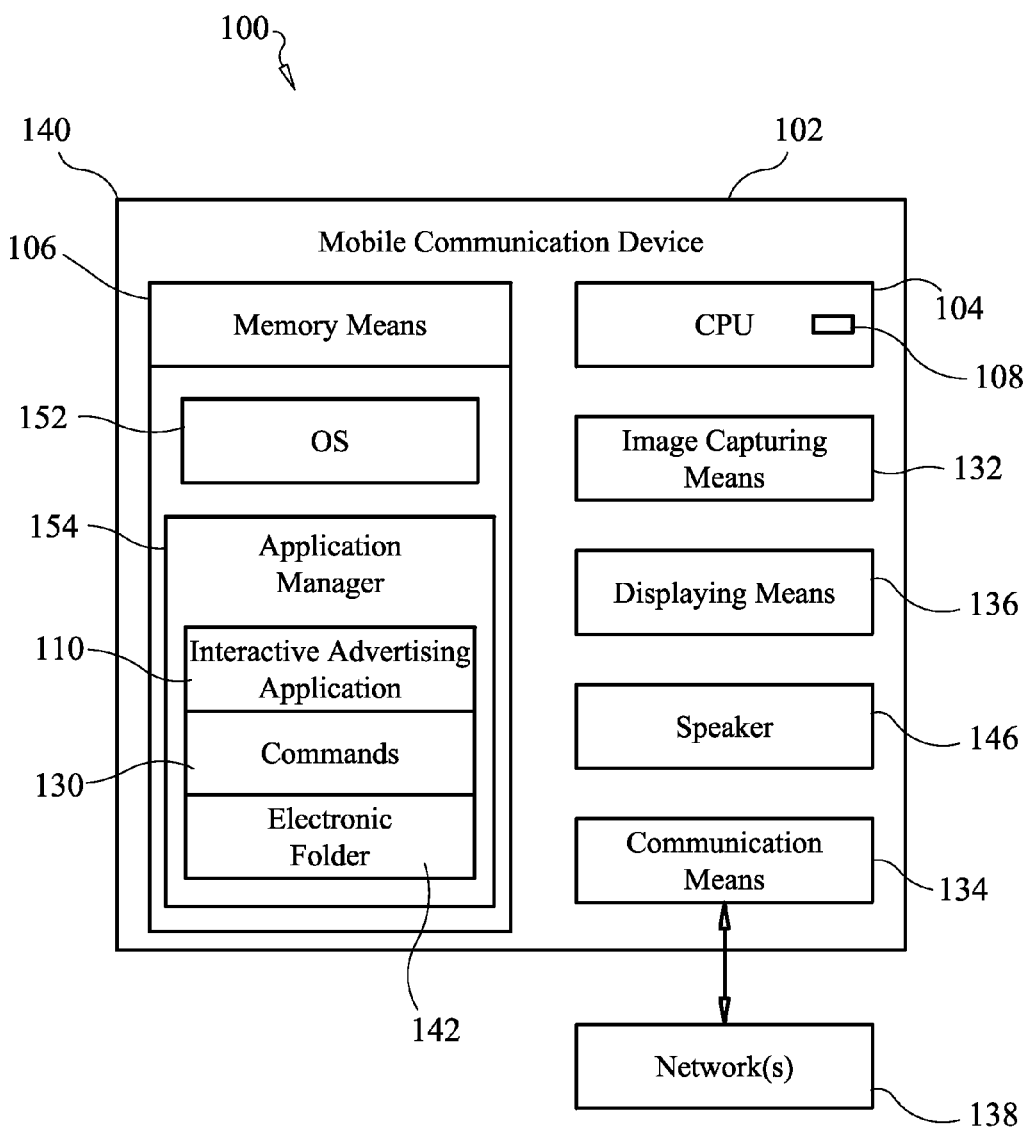
FIG. 1 is an exemplary system according to one embodiment of the invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems

FIG. 1 is an exemplary system 100 according to one embodiment of the invention. System 100 comprises of: a mobile device 102 that includes a computer processor 104 in electronic communication with memory means 106; computer executable instructions 108 readable and executable by the computer processor 104 and configured for performing any one or more of the following: launching an interactive advertising application program ("interactive advertising app") 110 configured for displaying third-party multimedia advertising content 111 and controlling the review of at least one multimedia content file 112 linked to at least one encoded image 114 framed by an interactive frame 116 that includes at least one or more hot corners 118, 120, 122, 124 which includes at least one or a plurality of embedded hyperlink(s) 126 or icon(s) 128 within, where upon activation of the at least one embedded hyperlink 126 or icon 128, the hyperlink 126 or icon 128 may be engaged for accessing and controlling the review of the multimedia content file 112 by overlaying the at least one encoded image 114 with the at least one embedded icon 128 which has an associated control command 130 for performing the control function; the mobile device's image capturing means 132 (e.g. a camera of the like and kind that are well known and used in the arts for mobile phones 102) for scanning the at least one encoded image 114 within the interactive frame 116 causing the at least one or more hot corners 118, 120, 122, 124 to be activated; memory means 106 for storing a captured at least one encoded image 114 that may be retrieved for user interaction; communication means 134 for retrieving the third-party multimedia advertising content 111 and the at least one multimedia content file 112 that is linked to at least one encoded image 114 framed by the interactive frame 116; and displaying means 136 for publishing the third-party multimedia advertising content 111 upon the scanning of the at least one encoded image 14 within the interactive frame 116 for which revenue may be derived for the publication of the third-party multimedia advertising content file 111 that is linked to the multimedia content file 112. In some embodiments, the third-party multimedia advertising content 111 is published first as a preview prior to the publication of the multimedia content file 112. In some embodiments, the publication of the third-party multimedia advertising content 111 is interspersed with the publication of the multimedia content file 112.

Third-party multimedia advertising content 111 and multimedia content file 112 as used herein may include any one or a combination of the following: videos, promotions, coupons, coupon codes, bar codes, discounts, pricing, availability, store locations, directions, television commercials, radio advertisements, print advertisements, movies, and movie trailers and the like. In some embodiments, the third-party multimedia advertising content 111 differs (in content, subject matter and source) from and may be wholly unrelated to, or tangentially related to the at least one multimedia content file 112 linked to at least one encoded image 114 framed by an interactive frame 116. For example, the at least one encoded image 114 may be related to, for example, an educational topic on "keeping the eco system for marine life viable," while the third-party multimedia advertising content 111 may comprise a promotion for fishing supplies. In this manner, revenue can be derived for the scanning of the at least one encoded image 114 and/or the displaying of the third-party multimedia advertising content 111 linked to the at least one multimedia content file 112, which may be programmed to play each time the at least one multimedia content file 112 is accessed post scanning by user.

Mobile device 102 may be any type of electronic computerized communication device configured with means for communicating wirelessly and/or wired with other mobile devices 102', 102", such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network 138, wide area network such as the Internet 138, or any other type of network device that may communicate over a network 138. Computer 140 as used herein includes but is not limited to a network enabled computer, cellular phones 102, a laptop or personal digital assistant subject to wired/wireless connectivity, and configured with a computer processor 104.

Mobile device 102 may include various hardware components, e.g. at least one or more computer central processor 104, memory means 106, and one or more communication means 134. Computer central processor 104 may be any type of processor, such as, but not limited to, a central processing unit (CPU), a microprocessor, a video processor, a front end processor, a coprocessor, a single-core central processor, a multi-core processor, and the like. Central processor 104 may be programmed to activate the interactive advertising app 110 running in background while the mobile device 102 is powered on, for viewing third-party multimedia advertising content 111 and multimedia content files 112, 112', which will be displayed on the mobile device's displaying means 136 in, for example, a graphical, audio, and/or text format or any combination thereof.

In some embodiments, the interactive advertising app 110 may have its own icon 128' or other visual indicator displayed thereon for launching or providing access to the interactive advertising app 110. When a user selects the respective interactive advertising app's icon 128' (e.g. by touching a touchscreen, or selecting it using a pointing device, roller ball, arrow keys, or other controller), where upon selection, the computer central processor 104, launches the interactive advertising app 110 and the computer central processor 104, which is electronically connected to the displaying means 136, controls the displaying means 136 to display the interactive advertising app 110 as launched on the at least one mobile device's displaying means 136.

Mobile device 102 may include at least one or more memory means 106 either electrically or mechanically connected to the at least one computer processor 104. In the case of electronic connections, the electronic connections may be wired and/or wireless connections. Memory means 106 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 106 may be used to store information, such as encoded images 114, 114', hyperlinks 126, 126', icons 128, 128' linked to the encoded images 114, 114', third-party multimedia advertising content 111, registered multimedia content files 112, 112' for the corresponding encoded images 114, 114', company's website address or Uniform Resource Locators (URLs), control commands 130, 130', interactive frames 116, 116', electronic folders 142, 142' for storing a plurality of captured encoded images 114, 114', directions 144 and the like. Information stored on the mobile device's memory means 106 may be retrieved using the computer processor 104 and may be published by push notification on the mobile device's displaying means 136 or broadcasted over a speaker 146 using the type and configuration of speakers that are well known and used in the arts for mobile devices 102, 102'.

Mobile device 102 is equipped with communication means 134, either electrically or mechanically connected to the computer central processor 104. In the case of electronic connections, the electronic connections may be wired and/or wireless. In some embodiments, communication means 134 may be a wireless communication means 134, which employ short range wireless protocol, such as, but not limited to, a radio frequency transceiver, a radio frequency receiver, and/or a radio frequency transmitter for communicating over the Internet 138 to access for example registered companies URLs and their corresponding third-party multimedia advertising content 111 and at least one or a more multimedia content files 112, 112' linked to at least one encoded images 114, 114' framed by interactive frames 116, 116' that may be displayed on, for example, printed statements 148, 148' or other electronic media (i.e. content requiring electronics for the user to access the content). Printed statement 148 as used herein includes but is not limited to: a business card, a menu, a program, a printed billboard advertisement, a printed article, magazine page, newspaper insert, and an advertising card. It is understood that each encoded image 114 is unique even if the multimedia advertisements 112, 112' are not.

In embodiments where the wireless communication means 134 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 134 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 134 are operative to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver and to communicate over the Internet 138.

Mobile device 102 includes a computer processor 104, disposed within and in electronic communication with the memory means 106. Computer processor 104 includes computer executable instructions 108 readable and executable by the at least one processor 104. Computer executable instructions 108 are operative to perform all the necessary functions for the system 100 and methods disclosed herein, including but not limited to: automatically launching the interactive advertising app 110, i.e. running a background service while the mobile device 102 is powered on, displaying third-party multimedia advertising content 111 and controlling the access and review of third-party multimedia advertising content 111, at least one multimedia content file 112 linked to at least one encoded image 114 framed by an interactive frame 116 that includes at least one or more hot corners 118, 120, 122, 124 which includes at least one or a plurality of embedded hyperlink(s) 126 or icon(s) 128 embedded within, and the like.

Computer executable instructions 108 may be loaded directly on the mobile device's processor 104, or may be stored in mobile device's memory means 106, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 108 may be any type of computer executable instructions 108, which may be in the form of a computer program, the program being composed in any suitable programming language or source code, such as C++, C, JAVA, JavaScript, HTML, XML, and other programming languages. In some embodiments, computer executable instructions 108 may be stored on a non-transitory computer readable medium readable by processor 104, wherein the non-transitory computer readable medium may comprise as computer memory, computer storage, and the like. The non-transitory computer readable medium may be part of the same device of which processor 104 is a part.

Interactive advertising app 110, which may be stored in the mobile device's memory means 106 also comprises of computer executable instructions 108' readable and executable by the at least one processor 104 and is configured for performing any all the necessary functions for the system 100 and methods of the invention, which may include any one or more of the following: displaying third-party multimedia advertising content 111; controlling the review of at least one multimedia content file 112 linked to at least one encoded image 114 framed by an interactive frame 116 that includes at least one or more hot corners 118, 120, 122, 124, which includes at least one or a plurality of embedded hyperlink(s) 126 or icon(s) 128 within, and configured for controlling the multimedia content file 112 corresponding to the at least one encoded image 114 when any one or more of the activated icons 128, 128' are engaged by an input device when the activated icon 128 is dragged and released into the designated area 150 by overlaying the at least one encoded image 114 with the at least one embedded icon 128, which has an associated control command 130; activating the at least one or more embedded icons 128, 128' and hyperlinks 126, 126' when the at least one encoded image 114 within when the interactive frame 116 is scanned; displaying the at least one multimedia content file 112 for the captured at least one encoded image 114 pursuant to a control command 130 represented by the at least one embedded icon 128; receiving at least one control command 130 for displaying the at least one multimedia content file 112 within the interactive frame 114 with full functionality for review and control when the multimedia content file 112 is published; wherein those control commands 130 for displaying the at least one multimedia content file 112 include but are not limited to any one or more of the following: play, stop, fast-forward, rewind, pause, maximize viewing, minimize, end and cancel; retrieving directions 144' related to the multimedia content file 112 for the captured at least one encoded image 114; displaying the directions 144, 144' as retrieved within the interactive frame 116; retrieving the third-party multimedia advertising content 111 and/or the at least one multimedia content file 112 by linking to an advertiser's website via its web address; providing for product purchases related to the encoded image 114; and storing a plurality of captured encoded images 114, 114' within an electronic folder 142 with full functionality for managing stored electronic data as is customary in the arts.

In some embodiments of the present invention, each interactive activity icon 128 represents a distinct control command and review function. Each interactive activity icon 128 may be selected by a user using an input device (e.g. by touching a touchscreen, or selecting it using a pointing device, roller ball, arrow keys, or other controller), and "dragged" or moved into the designated area 150 in the encoded image 114, which would activate the function associated with a particular interactive activity icon 128. The activation area 142 is visually represented herein as the middle of the encoded image 114, however there are no limitations placed on the location of the designated area 150.

Mobile device 102 may include any kind of displaying means 136, such as, but not limited to: a liquid crystal display ("LCD") screen, a light emitting diode ("LED") display, touchpad or touch screen display, and/or any other means known in the arts for emitting a visually perceptible output. Mobile device's processor 104 is in electronic communication with its displaying means 136. In other embodiments, displaying means 136 is wirelessly connected to processor 104. Displaying means 136 may include control means, such as, but not limited to, a touch screen, a stylus, and the like. In some embodiments, displaying means 136 may be electronically connected to a mobile device 102 according to the hardware and software protocols that are known and used in the arts. Computer central processor 104 controls the mobile device's displaying means 136, which is configured for displaying the at least one or more encoded images 114, third-party multimedia advertising content 111, multimedia content files 112, 112' and the like.

Mobile device 102 also includes software components that may be stored in the memory means 106. Memory means 106 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by mobile device 102. Mobile device 102 may also contain an input element for inputting data and an output element for displaying data.

Also stored on the memory means 106 may be an operating system 152, application manager 154, and the interactive advertising app 110. Interactive advertising app 110 may be an independent component or may be incorporated into the operating system 152. Interactive advertising app 110 is a computer-executable component, readable and executable by the computer processor 104, wherein the interactive advertising app 110 links to the Internet 138 to retrieve at least one or more third-party multimedia advertising content 111 and the multimedia content files 112, 112' to be displayed on the mobile device's displaying means 136 or the printed statement 148. The third-party multimedia advertising content 111 and the multimedia content files 112, 112' may be in any format, e.g. audio, video, pictorial, text message, graph, and as such is published or also broadcasted in any format on the mobile device 102.

Application manager 154 comprises of computer-executable components that operate on the mobile device 102 and may be implemented in a variety of ways. In one embodiment of the invention, application manager 154 may use one or more computer-executable components for interacting with interactive advertising app 110. In another embodiment, interactive advertising app 110 is incorporated in application manager 154 to receive information from the input element, to communicate with, and/or to control the operations of interactive advertising app 110.

Interactive advertising app 110 may comprise in part of a browser, such as for use on the mobile device 102, or a similar browsing device. Interactive advertising app 110 may be any type of software application, such as a standalone application designed to run on a mobile platform, such as a mobile device running an operating system 152, such as iOS™, Android™, Windows Mobile™, Blackberry™, and the like. Interactive advertising app 110 may be operative for an iPhone, any other "smart phone," mobile device, cellular phone, PDA, GPS or any other mobile device 102 capable of handling electronic transactions dealing with dynamic content, object, application, or software. In some embodiments, the interactive advertising app 110 may be designed to run on a social network platform, such as FACEBOOK® or JUSTSYNC®. In some embodiments, interactive advertising app 110 may reside on a server computer and may be downloadable from the server computer or otherwise reside in the mobile device's local memory means 106. For example, in one embodiment, the interactive advertising app 110 may be on a mobile device (such as an iPhone, Blackberry, or other "smart phone") and the full-sized software program may be on a computer, where communications may occur over a network 138 or directly, either wired or wirelessly.

Figure 2A:
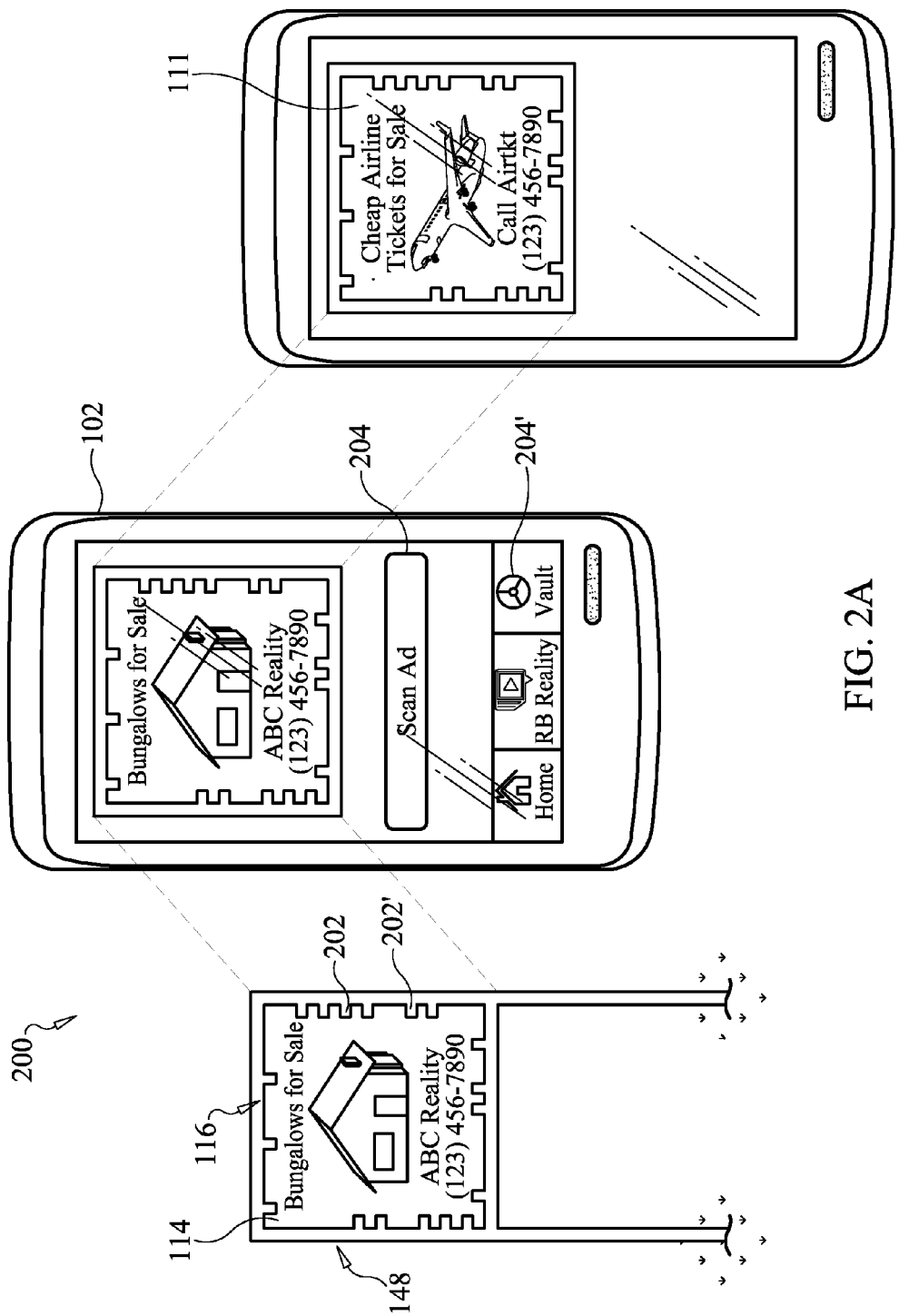
FIGS. 2A-2C show an exemplary system of the invention according to one embodiment.
Figure 2B:
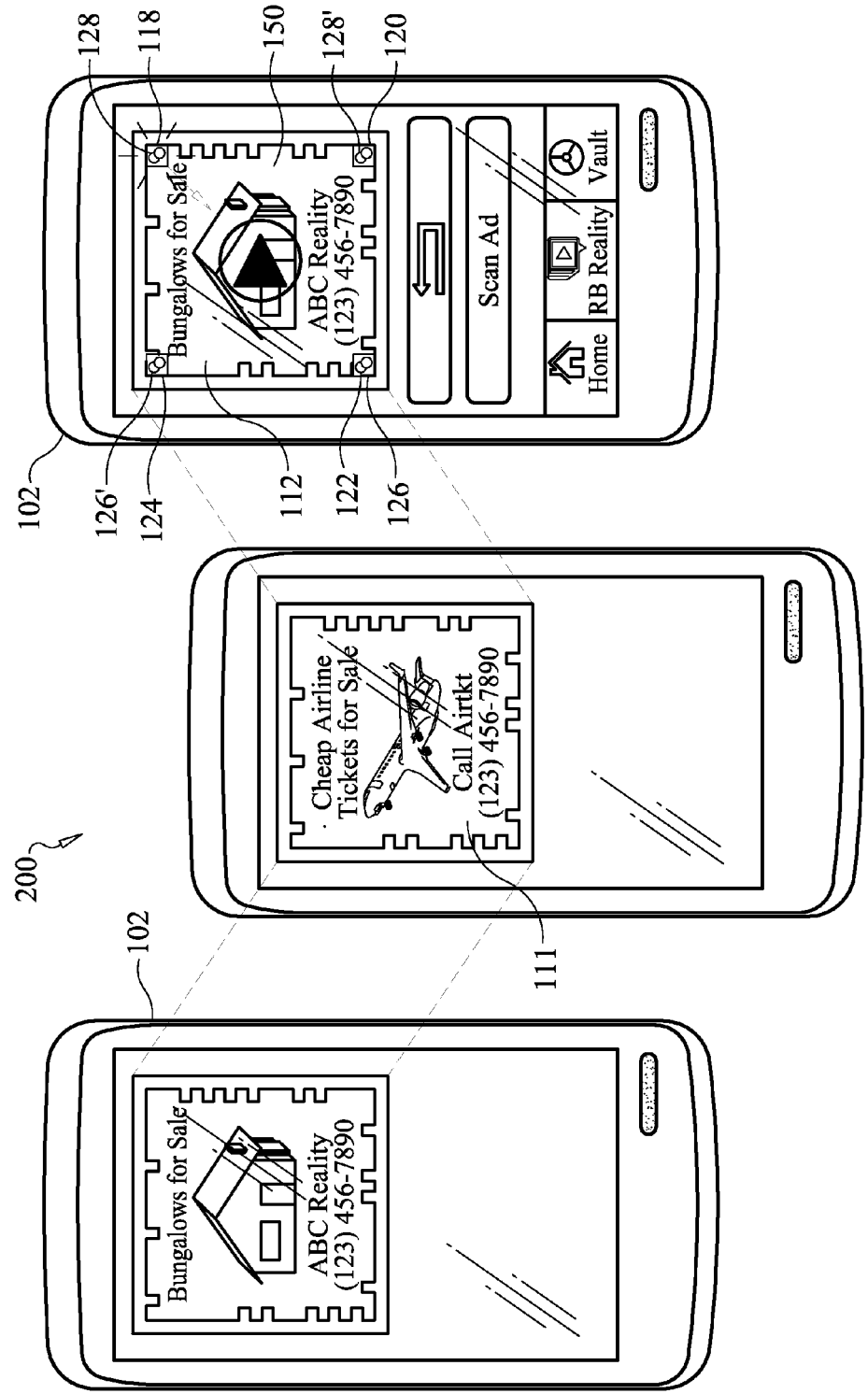
Figure 2C:
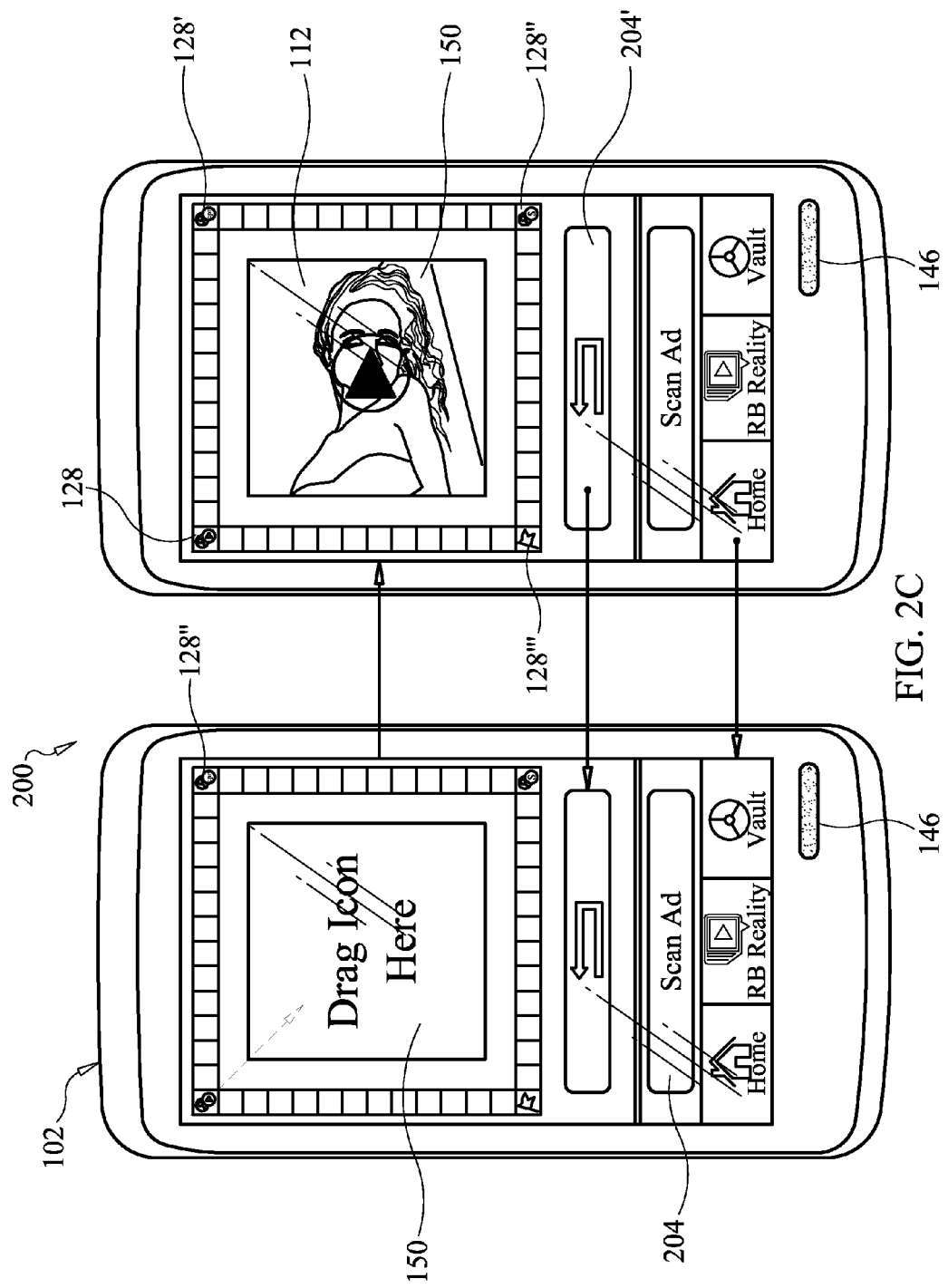

FIGS. 2A-2C show an exemplary system 200 of the invention according to one embodiment. As previously discussed, the interactive advertising app 110 may appear as one or more icons 128, 128' on the mobile device's displaying means 136 that may be manually activated to launch the interactive advertising app 110 or different segments of the app 110, while in some embodiments the interactive advertising app 110 is automatically launched as soon as the mobile device 102 is turned on, where the interactive advertising app 110 may run a background service while the mobile device 102 is powered on. In background mode, user may continue to use the mobile device 102 in its customary and ordinary use, e.g. make calls, create and respond to SMS text messages or use the mobile device 102 in any other manner deemed ordinary and customary use while the interactive advertising app 110 runs in the background.

In either embodiment, once the interactive advertising app 110 is launched, user may use the interactive advertising app 110 on the mobile device 102 to scan the at least one encoded image 114 framed by an interactive frame 116 as displayed on a printed statement 148 or electronic media that includes at least one or more hot corners 118, 120, 122, 124 with at least one hyperlink 126 or icon 128 embedded within. The interactive advertising app 110 may include virtual radio buttons 204, 204', e.g. "Scan Ad," identifying the command 130 to be executed, i.e. scanning the encoded image 114 within the interactive frame 116. As soon as the mobile device's image capturing means 132, scans the at least one encoded image 114 within the interactive frame 116 it links over the network 138 to retrieve the third-party multimedia advertising content 111, retrieves and publishes the third-party advertising content 111 and causes the at least one or more icons 128, 128' to be activated for interactive display and control of the multimedia content file 112 using the respective commands 130, 130' represented by the icons 128, 128' to control the multimedia content file 112 by overlaying the encoded image 114 with at least one icon 128, i.e. dragging the icon 128 to the designated area 150. In scanning the encoded image 114 it activates embedded icons 128, 128' and/or hyperlinks 126, 126' that become visible in the hot corners 118, 120, 122, 124. The activated at least one or more hot corners 118, 120, 122, 124 may pulsate, blink or the icons 128, 128' may be displayed in a color contrast or animated format to alert the user of the option to interact with the encoded image 114 by exploring one or more of the interactive control commands 130, 130'.

In the exemplary embodiment shown in FIG. 2A, using a mobile device 102 a user may interact with the exemplary printed (non-electronic) billboard 146 by scanning the encoded image 114, which has additional markings 202, 202' that distinguishes it from the norm, such that it visually indicates to a casual observer that there is more to the encoded image 114 than the printed words and images. For users familiar with the systems 100, 200, and method, the markings 202, 202' are familiar indicating that the advertisement is an encoded image 114. For new users, the billboard's encoded image 114 invites the user to place his/her mobile device 102 on the encoded image 114. In doing so, the computer executable instructions 108 executable by the computer processor 104 is configured for launching the interactive advertising app 110 that comprises of computer executable instructions 108', also executable by the mobile device's computer processing unit 104, and scans the encoded image 114. In some embodiments, the icons 128, 128', 128", 128''' are hidden and are embedded within the encoded image 114, i.e. not viewable until activated when the encoded image 114 is scanned by the image capturing means 132.

Once the encoded image 114 has been scanned, the interactive application app 110 that comprises of computer executable instructions 108 readable and executable by the processor 104 issues an executable command to the processor 104 to activate the communication means 134 to link via an operative network 138 to, for example, access and retrieve one or more third-party multimedia advertising content 111 linked to the at least one or a more multimedia content files 112, 112' that is linked to at least one encoded images 114, 114' framed by interactive frames 116, 116'. The located third-party multimedia advertising content 111 when located is received by the system 200 for publication. In some embodiments, the one or more third-party multimedia advertising content 111 may be displayed prior to the displaying of the multimedia content files 112, 112' as shown where the third-party multimedia advertising content 111 for "Cheap Airline Tickets" is wholly unrelated to the owner of the multimedia content file 114, ("ABC Realty). In some embodiments, publication of the third-party multimedia advertising content 111 may be interspersed at anytime during the publishing of the multimedia content files 112, 112' linked to at least one encoded images 114, 114'. This allows multimedia content files 112, 112' owners or the administrator of the system to sell the rights for advertising fees to advertise third-party multimedia advertising content 111 to be displayed in conjunction with the publishing of the multimedia content files 112, 112'.

As shown in FIG. 2B, in the exemplary embodiment the third-party multimedia advertising content 111 has already been published and the user may now interact and control the reviewing of the multimedia content file 112 by overlaying the at least one encoded image 114 in the designated area 150 with at least one icon 128 representing a control command 130 for controlling the display and review of the multimedia content file 112. The system and method disclosed herein requires registration of the interactive frame 116 and the owner or promoter (collectively referred to herein as "owner) that has corresponding multimedia content file 112 linked thereto, to support the interactive augmented reality frames 116, 116', such that the encoded images 114, 114' will be recognized by the interactive advertising app 110 and the corresponding multimedia content file 112 as well as the third-party multimedia advertising content 111 can be retrieved and published on user's mobile device's displaying means. It is understood that each encoded image 114 is unique, e.g. contains embedded random numbering such that the correct corresponding multimedia content file 112 and third-party multimedia advertising content 111 linked thereto are retrieved as no two encoded images 114, 114' are alike.

In one embodiment, the advertiser registers with the systems 100 & 200 and method described herein, and the encoded images 114, 114' are created for the advertiser and linked to the corresponding multimedia content file 112, 112. Thus, any user scanning the encoded image 114 may review the third-party multimedia advertising content 111 linked for publication with multimedia content files 112 as retrieved from the interactive advertising app's stored electronic data, which may comprise of memory means 106' utilizing an electronic database 106' connected to a remote server computer 138 that hosts and supports the interactive app 110. Advertising time and space may be sold to interested parties for the opportunity to have their third-party multimedia advertising content 111 linked for publication with multimedia content files 112, 112'. The revenue model may vary as the system may allow the owners of the multimedia content files 112, 112' to track usage and uploads or the system may track the statistical information and calculate the fees due.

In some embodiments, advertiser has a customized version of the interactive advertising app 110, and advertiser may create its own encoded images 114, 114' linked to corresponding multimedia content file 112, 112 and the advertiser may have some decision in deciding which third-party multimedia content 111 will be linked and published in conjunction with the multimedia content file 112. Notwithstanding the advertiser's control over newly created encoded images 114, 114' with corresponding multimedia content file 112, 112', each encoded image 114 with the interactive frame 116 is coded uniquely, e.g. containing embedded random numbering such that the correct corresponding multimedia content file 112 is retrieved so that no two encoded images 114, 114' for two different advertisers are alike. A user scanning the encoded image 114 may review the corresponding multimedia content file 112 as retrieved from the interactive advertising app 110's electronic database 106', or as linked to the advertiser's website to locate the stored multimedia content file 112.

In some embodiments, the control command 130 may include storing the at least one encoded image 114 for later review. As such, after the image capturing means 132 captures the encoded image 114, the app 110 may store the at least one encoded image 114 within the interactive frame 116 with the embedded hyperlink 126 or icon 128 within the mobile device's memory means 106 where it can be retained and stored for future use and retrieval even though the mobile device's image capturing means 202 may no longer be hovering over the encoded image 114. For example, while travelling a user may be riding a bus, subway or travelling by car and briefly viewed the at least one encoded image 114 without having time to fully review the multimedia content file 112 associated with the same or connectivity is limited or unavailable for underground subways and therefore the encoded image 114 and the third-party multimedia advertising content 111 or the multimedia content 112 may not be viewable until connectivity is restored.

In some embodiments, the ability to fully capture the encoded image 114 is restricted because of the pixilation of the mobile device's image capturing means 132. In that embodiment, an add-on autofocus lens may be attached to the mobile device's image capturing means 132 with more powerful lens, e.g. 12-30 megapixels such that the user can capture distant images, e.g. billboards 146, 146', encoded images 114, 114' regarding other public events and the like that may be posted in public areas, on fences, walls, etc.

Once captured, interactive advertising app 110 is configured for storing one and/or a plurality of captured encoded images 114, 114' within an electronic folder 142, e.g. titled "AD VAULT" for ease of reference but could easily have been titled anything else or customized according to the user's preferences. The encoded images 114, 114' may be stored in the electronic folder 142 where the user may edit, add, delete, forward, save, play and use any other (editing) control commands 130, 130' as are generally used in the arts for managing and/or administering stored electronic data. For example, user may later review the multimedia content file 112 for the encoded image 114 long after the user is no longer in the vicinity.

When the user is ready to review at least one multimedia content file 112, the interactive advertising app 110 is configured for retrieving the stored at least one encoded image 114. In some embodiments, the at least one multimedia content file 112 is retrievable from the mobile device's memory means 106 or by linking to an advertiser's website via its web address where it is retrieved and displayed on the mobile device's displaying means 136 if the interactive frame 116 is still listed as an active frame with the systems 100, 200. The multimedia content file 112 is controlled by the interactive advertising app 110, which by its computer executable instructions 108' control the displaying of the third-party multimedia advertising content 111 and the at least one multimedia content file 112 with full functionality for review and control using control commands 130, 130' which include but are not limited to any one or more of the following: play, stop, fast-forward, rewind, pause, maximize viewing, minimize, end and cancel. In some embodiments, the control commands 130, 130' are fully displayed, e.g. "STORE AD" or "GET DIRECTIONS". It is understood that the clickable icon 128 may be in any particular geometric shape or other configuration as it is representative of a control command 130 for controlling the multimedia content file 112 for the encoded image 114.

In some embodiments, the interactive advertising app 110 is configured for capturing statistical information for the at least one encoded image 114, the third-party multimedia advertising content 111 and/or the multimedia content file 112 being viewed and for providing reports based on captured statistical information. Statistical information may be used for example to determine the number of: uploads of the encoded image 114, publishing of the third-party multimedia advertising content 111 and/or the multimedia content file 112 from which financial calculations can be made concerning the advertising fees due to the owner of the multimedia content file 112 for allowing the third-party multimedia content 111 to be displayed in conjunction with the owner's multimedia content file 112, as well as designated fees for the system administrators for supporting the framework behind the systems and methods. In one revenue model, revenue is derived on a pay per scan of the encoded image 114, while in other embodiments, revenue is derived on a pay per publishing schedule as each time the encoded image 114 (which may be stored and retrieved) is accessed for publication, the interactive advertising app 110 tracks the communications means 134 linking over the Internet 138 to retrieve the third-party advertising content and/or multimedia content file 112.

The at least one multimedia content file 112 may be published in any one or more of the following formats: audio, video, pictorial, graphical or text format. Accordingly, advertisers target their messages for their products and services for the user's review as clearly only those persons that are interested in learning more about the product will bother to scan encoded images 114, 114' from the printed statement 148, activate the icons 128 and/or hyperlinks 126 for the encoded images 114, 114'.

As shown in FIG. 2C, the icon 128 for the control command 130 for displaying the multimedia content file 112 was selected causing the interactive advertising app 110 to display at least one or more multimedia content file 112, 112' related to the encoded image 114 within the interactive frame 116 on the mobile device's displaying means 136. The multimedia content file 112 may be displayed in audio, audiovisual, display or multimedia format within the interactive frame 116. While the multimedia content file 112 is being displayed, the icons 128, 128', 128", 128''' are still visible and accessible for controlling the multimedia content file 112. Here, the exemplary multimedia content file 112 is a video for which the display may be further manipulated and/or controlled using the interactive advertising app' radio button 204, 206', e.g. play, rewind, fast forward, maximize, pause or stop the multimedia content file 112 being played. As such, the interactive advertising app 110 makes a determination of whether a corresponding multimedia content file 112 exists; conducts at least one electronic computerized search for the corresponding multimedia content file 112 linked to the encoded image 114 on the mobile device's memory means 106 or hyperlinks to the Internet 138 to obtain the multimedia content file 112 from, e.g. the advertiser's website; retrieves the at least one multimedia content file 112; and displays the at least one multimedia content file 112 on the mobile device's displaying means 114. Accordingly, owners of the multimedia content file 112 and can market their products and services with targeted messages for their customers.

Interactive advertising app 110 includes computer executable instruction code 112 configured for tracking variables determinative of the type of lead for an electronic lead generation form based on the level of the review and/or identity of verifiable individual contact information. Variables being tracked include but are not limited to: the length of time expended in reviewing the company's profile during a review session, number of additional related searches based on keywords within the company's profile, number of keystrokes within any given review session to determine whether the search is active or latent because of session time out or computer in sleep mode. System 200 is configured for receiving a request for publishing a blank lead generation form 208 (not shown), from which the measured variables are used to create an indicator as to the type of lead, e.g. cold, warm or hot and the like, wherein the indicator is represented by a visual key 210 (not shown) such that the recipient has a visible key indicative as to the type of lead.

Figure 3A:
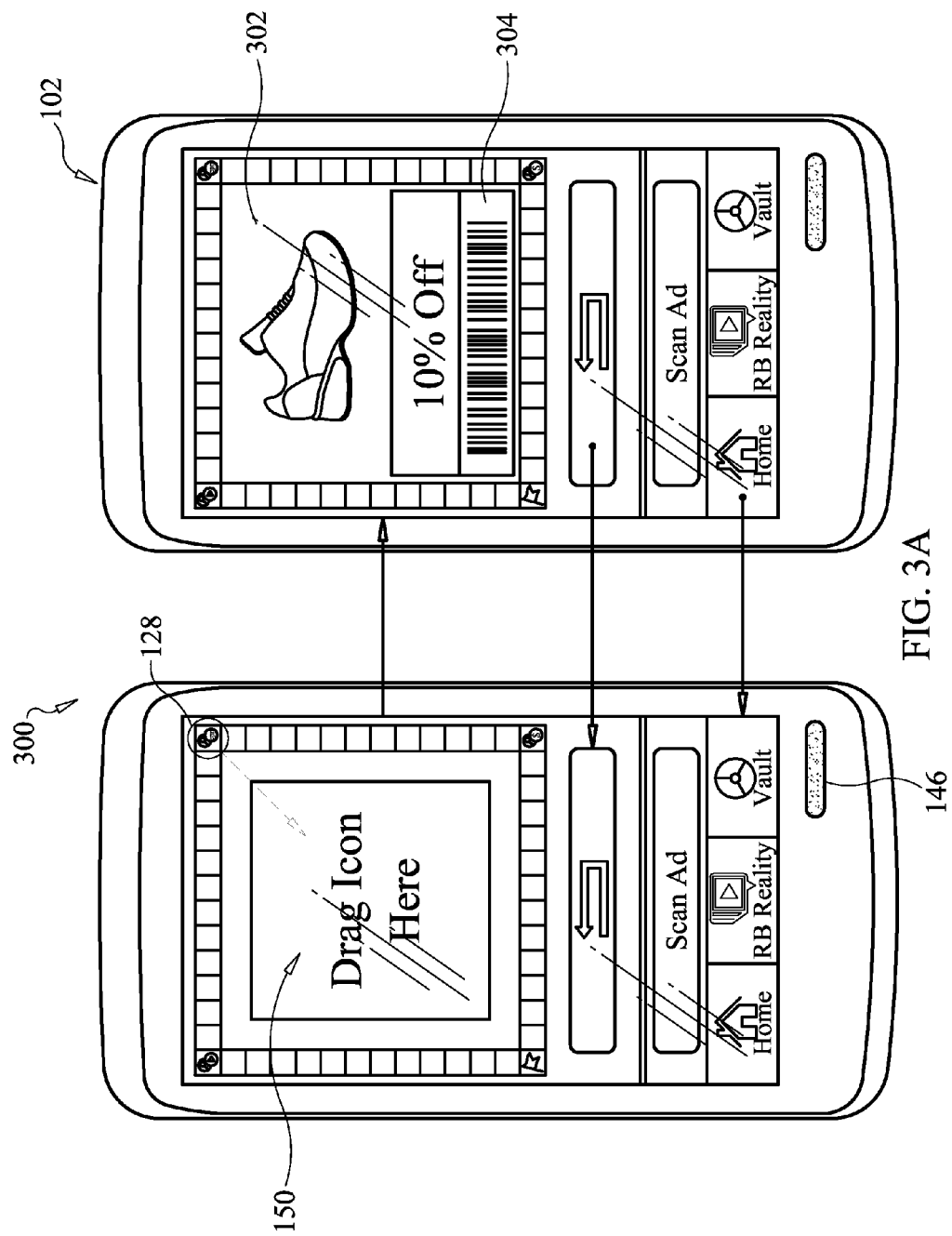
FIGS. 3A & 3B show an example of the system in use according to one embodiment.
Figure 3B:
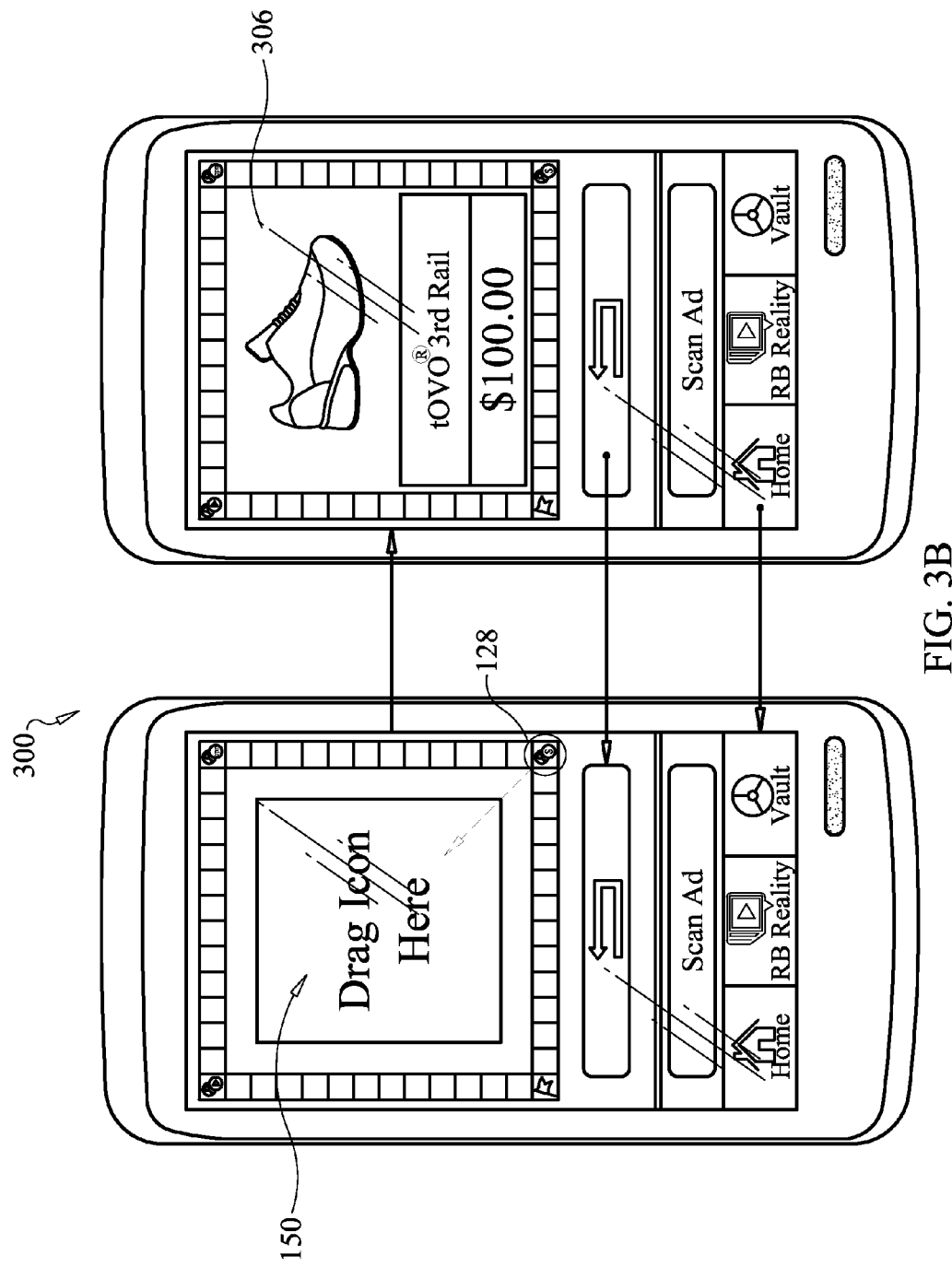

FIGS. 3A & 3B show an example of the system 300 in use according to one embodiment. As shown in FIG. 3A, the operative interactive icon 128 that was activated included the control command 130 for displaying any related promotions 302, e.g. an electronic coupon 302, within the interactive frame 116. Here, the encoded image 114 included a promotion for a shoe product, and as such when the icon 128 for displaying coupons 302, 302' was activated, the interactive advertising app 110 searched the mobile device's memory means 106 or hyperlinked to the app's electronic database 106' or the advertiser's website to locate the related coupon 302 for display within the interactive frame 116. As shown, the other icons 128', 128", 128''' are still visible and accessible for user interaction. Accordingly, user has the option of displaying the coupon 302 for a purchase at a store as the coupon's barcode 304 is visible for scanning and also available via user's mobile device 102.

As shown in FIG. 3B, the operative interactive icon 128 for the control command 10 for displaying product details 306, e.g. product description, including pricing or other specifications, which may be displayed as a visual image as opposed to a video within the interactive frame 116.

Figure 4:
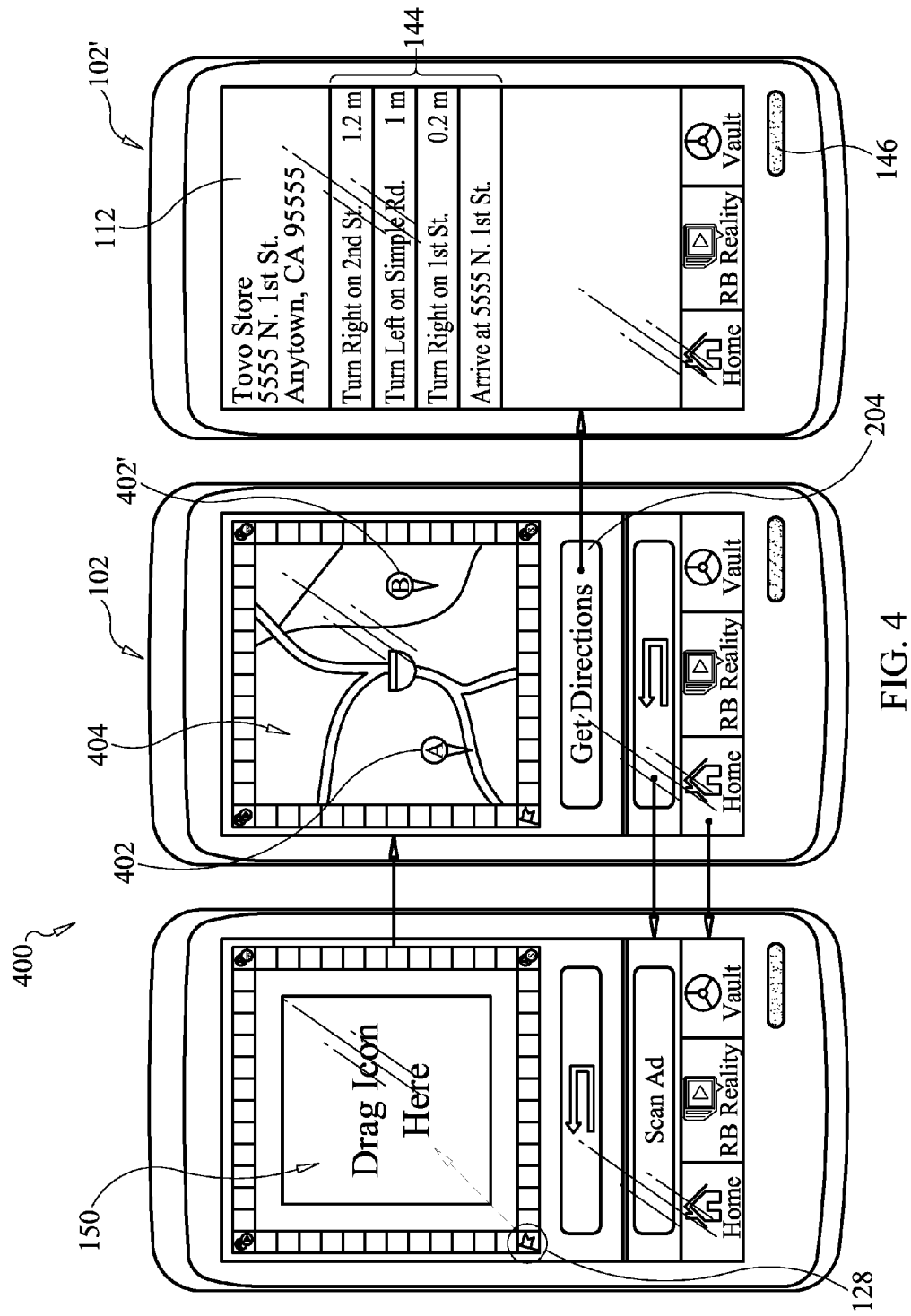
FIG. 4 shows an exemplary system according to one embodiment of the invention.

FIG. 4 shows an exemplary system 400 according to one embodiment of the invention. Here, the interactive icon 128 is operative for the control command 130 for locating stores 402, 402' that sells the advertised product. As such, embedded within the interactive frame 116 is a hyperlink 126 to link to the Internet and/or further the store's web address to locate stores 402, 402'. As shown, once the stores 402, 402' are located, directions 144 to these stores 402, 402' may be obtained using an exemplary radio button 204. The directions 144 may be provided as a map 404 or detailed listing including turn by turn directions 144 for the location of a particular store 402 or broadcasted in audio over the speaker 146.

Figure 5A:
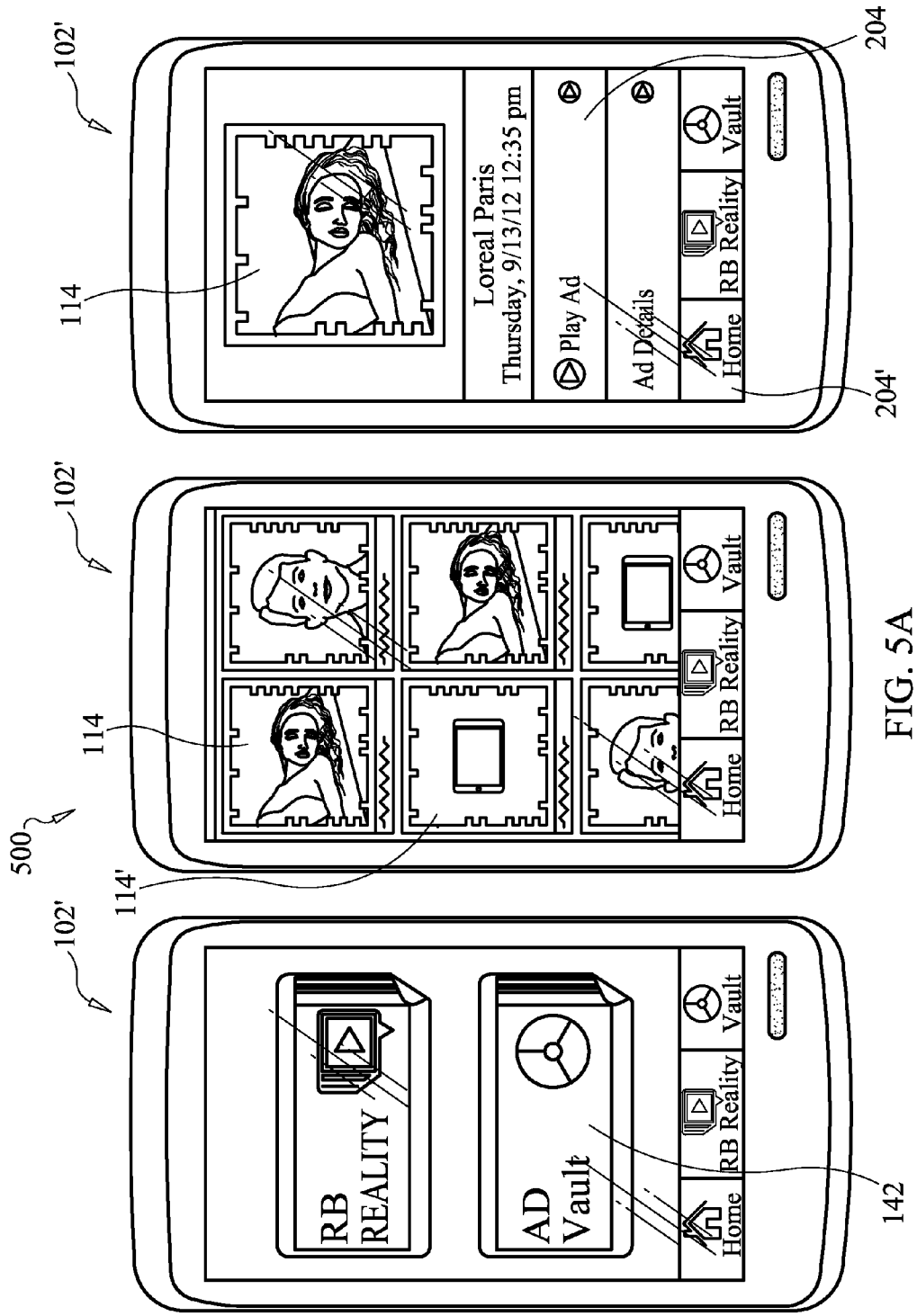
FIGS. 5A & 5B show an exemplary system according to one embodiment of the invention.
Figure 5B:
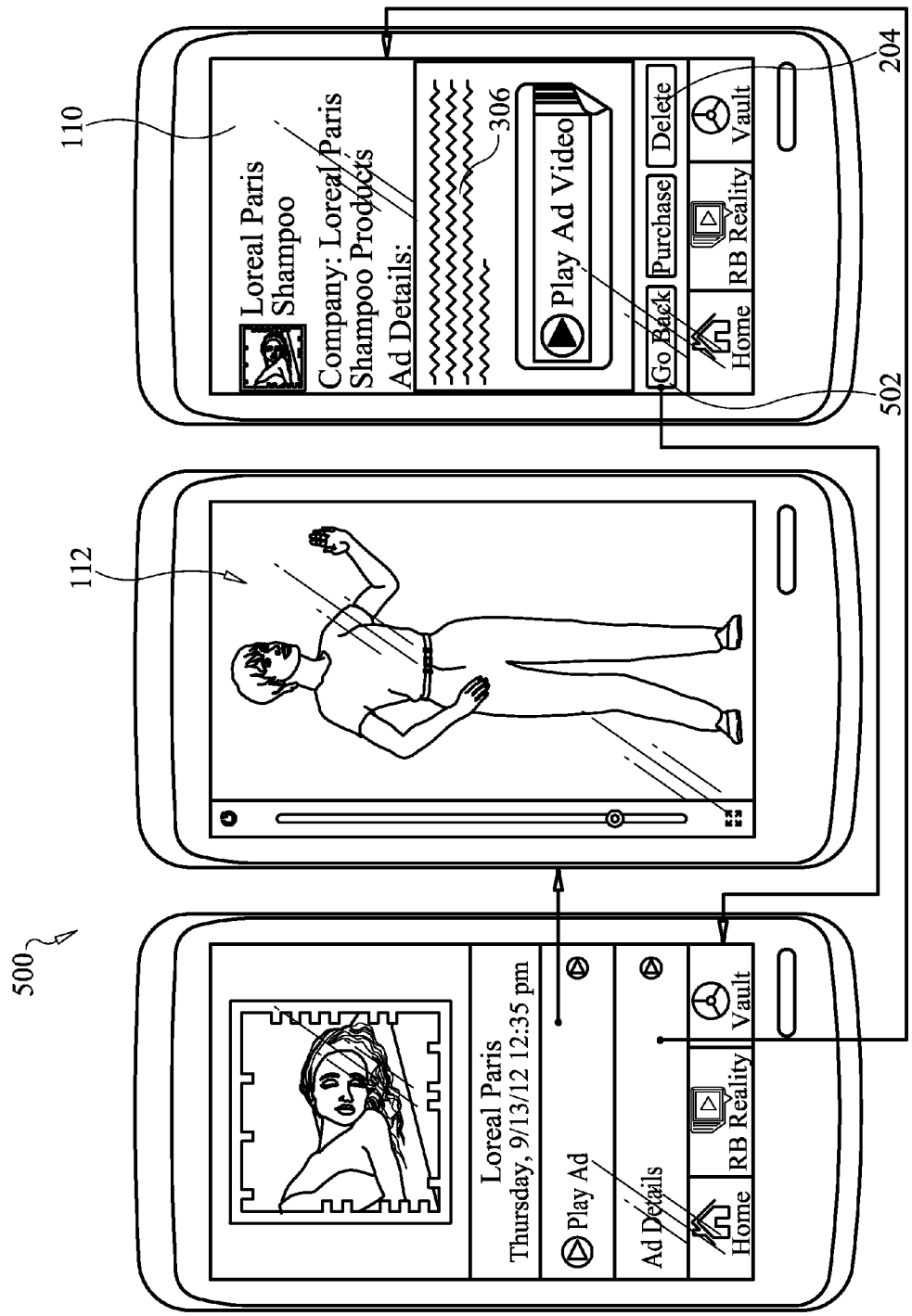

FIGS. 5A & 5B show an exemplary system 500 according to one embodiment of the invention. As previously mentioned, all scanned encoded images 114, 114' automatically get stored in an electronic folder 142 ("AD VAULT") for later retrieval and review. User maintains control over what encoded images 114, 114' are retained or deleted, e.g. a user may long-tap a stored encoded image 114 to delete it from the electronic folder 142. As such, when the user is ready to review the corresponding multimedia content file 112, the interactive advertising app 110 may have radio buttons 204, 204' to, for example, select the encoded image 114 and for example play the third party multimedia advertising content 111 prior to, or as an advert interruption to the multimedia content file 112 linked to the encoded image 114 or obtain directions 140 for stores or retrieve coupons 302, 302'. In selecting an exemplary encoded image 114 for displaying the multimedia content file 112, user may learn more details for the product being advertised, e.g. there may be a radio button 204 for "Ad Details," which if depressed may yield additional information or yield hot links 502 to the advertiser's website. The product details 306 may be displayed in text, e.g. company offer and/or a video, which can be played on the mobile device's displaying means 136. Additional radio buttons 206, 206' may be displayed allowing the user to perform additional transactions or interaction with the encoded image 114. For example, in an exemplary embodiment, user may click the radio button 204 to purchase the product e.g. either via a secondary app 110' or a link to the advertiser's website where the user may purchase the same. As such the interactive advertising app 110 provides for product purchases (goods and services) related to the encoded image 114.

Figure 6A:
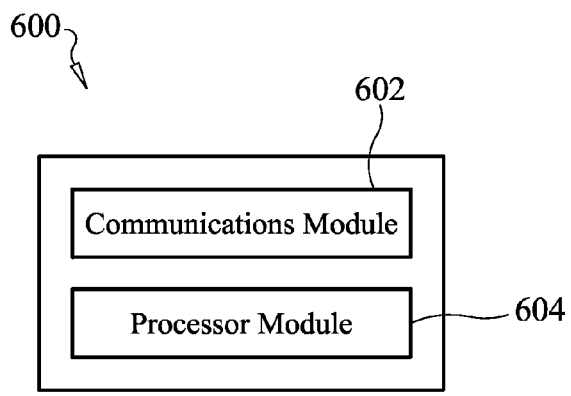
FIGS. 6A & 6B show an exemplary system according to one embodiment of the invention.
Figure 6B:
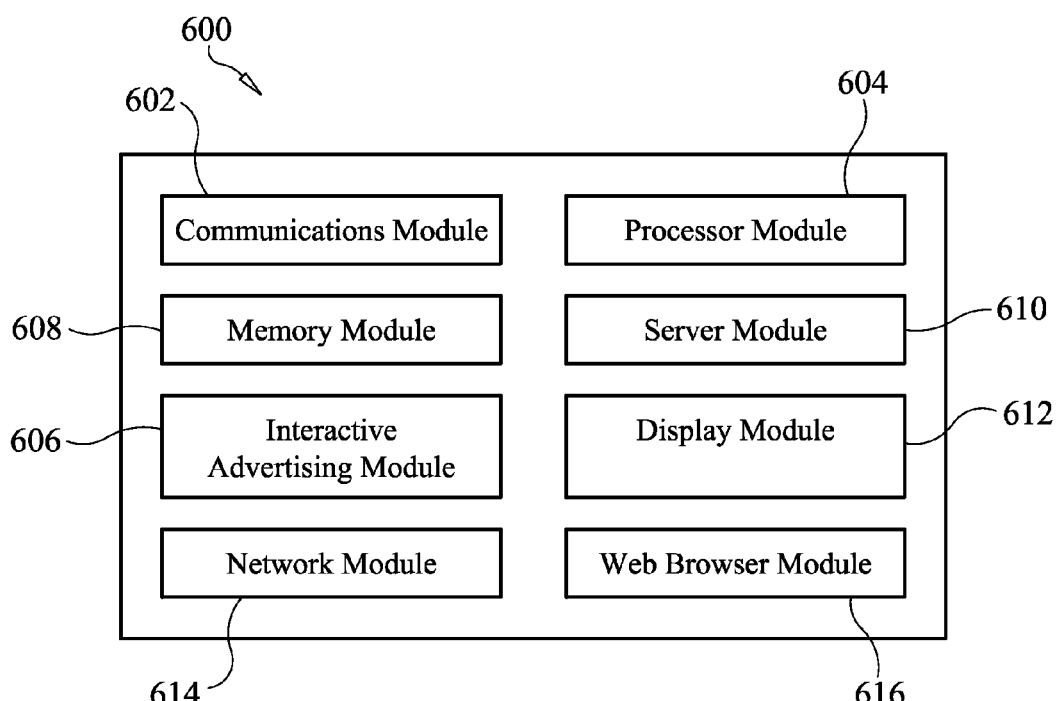

FIGS. 6A & 6B represent a system 600 in accordance with one embodiment. System 600 comprises of a communications module 602 and a processor module 604 configured for performing the system's 600 functions mentioned herein. The term "module," as used throughout this disclosure, may refer to a unit of distinct functionality that may be presented in software, hardware, or combinations thereof. When the functionality of a module is performed in any part through software, the module includes a machine readable medium.

Communications module 602 is configured for communicating over the computer network 138 to locate for example the third-party multimedia advertising content 111 and the multimedia content file 112, 112' for one or more advertisers. In one embodiment, communications module 602 may comprise a hardware aspect, such as communications hardware. Such communications hardware may include, but is not limited to, a network adapter and/or card, a modem, and the other like communications means 132 that are well known and used in the arts and other future wireless protocol suitable for transmitting and receiving data. In yet another embodiment, communications module 602 may comprise both hardware and software aspects, such as those described directly above and elsewhere throughout the present disclosure. Communications module 602 is operative to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver.

Processor module 604 may comprise of a hardware aspect such as a computer processor 104, including, but not limited to, any of those previously described with reference to the embodiments described throughout the present disclosure. In another embodiment, processor module 604 may comprise of a software aspect, such as, but not limited to, a computer program, such as an operating system, matching software, word parsing software, word editor, multimedia player and the like. In yet another embodiment, processor module 604 may comprise both hardware and software aspects, such as those described directly above and elsewhere throughout the present disclosure. In some embodiments, processor module 604 may include software, e.g. computer software program, and hardware components to activate the interactive advertising module 606 for processing encoded images 114, third-party multimedia advertising content 111 and multimedia content file 112.

As shown in FIG. 6B, system 600 comprises of a memory module 608 to store for example, encoded images 114, 114', hyperlinks 126 corresponding to the encoded images 114, third-party multimedia advertising content 111 linked to registered multimedia content file 112, 112' that are linked to the corresponding encoded images 114, 114', company's website address or advertisers' URLs, control commands 130, 130' and the like. Memory module 608 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory module 608 may possess a software aspect, such as, but not limited to, database building software, file management software, and the like. In yet another embodiment, memory module 608 may comprise both hardware and software aspects, such as those described directly above and elsewhere throughout the present disclosure.

System 600 further comprises a server module 610 to control the systems 100-600 functions discussed herein. Server module 610 may host the interactive advertising module 606 for reading the encoded images 114, 114', linking to advertiser's websites to retrieve the third-party multimedia advertising content 111 and other registered users' multimedia content files 112, 112' where the third-party multimedia advertising content 111 may be published for example as a preview to the multimedia content file 112, for which access may be made a closed computer network 138, such as, but not limited to, a local area network (LAN), a wide area network (WAN), an integrated services digital network, a dial-up network, or other forms of a closed computer network 138.

In an alternate embodiment of system 600, server module 610 provides for access over an open computer network 138, such as, but not limited to, a world-wide-web, e.g. the Internet 138 or other forms of an open computer network 138. In one embodiment, server module 610 may comprise a hardware aspect, such as, but not limited to, a server computer 138. In another embodiment, server module 610 may comprise a software aspect, such as hosting computer software, including, but not limited to, a server operating system. In yet another embodiment, server module 610 may comprise both hardware and software aspects, such as those described directly above and elsewhere throughout the present disclosure.

System 600 includes the interactive advertising module 606 that comprises a software aspect, e.g. a computer software program that resides on a server computer 138. In another embodiment, the interactive advertising module 606 may comprise of a hardware aspect. In yet another embodiment, the interactive advertising module 606 may comprise both hardware and software aspects, such as those described directly above and elsewhere throughout the present disclosure. Interactive advertising module 606 comprises of software program comprising of computer executable instructions 106 readable and executable by the computer processor 104 and configured for: retrieving third-party multimedia advertising content 111 for publishing the third-party multimedia advertising content 111 that may be wholly unrelated (source, media format and subject matter) to the multimedia content file 112, controlling a multimedia content file 112 corresponding to at least one encoded image 114 framed by an interactive frame 116 that includes at least one or more hot corners 118, 120, 122, 124 with at least one hyperlink 126 or icon 128 embedded within, responsive to the control command 130, and configured for controlling the multimedia content file 112 corresponding to the at least one encoded image 114 within the interactive frame 116 by overlaying the at least one encoded image 114 with the at least one embedded icon 128, which has an associated control command 130; activating the at least one or more hot corners 118, 120, 122, 124 when the at least one encoded image 114 within the interactive frame 116 is scanned; displaying the at least one multimedia content file 112 for the captured at least one encoded image 114 pursuant to a control command 130 associated with the at least one embedded icon 128; receiving at least one control command 130 for displaying the at least one multimedia content file 112 within the interactive frame 114 with full functionality for review and control when the multimedia content file 112 is published; wherein those control commands 130 for displaying the at least one multimedia content file 112 include but are not limited to any one or more of the following: play, stop, fast-forward, rewind, pause, maximize viewing, minimize, end and cancel; retrieving directions 144' related to the multimedia content file 112 for the captured at least one encoded image 114; displaying the directions 144, 144' as retrieved within the interactive frame 116; retrieving the at least one multimedia content file 112 by linking to an advertiser's website via its web address; providing for product purchases related to the encoded image 114; and storing a plurality of captured encoded images 114, 114' within an electronic folder 142 with full functionality for managing stored electronic data as are customary in the arts.

System 600 further comprises of a display module 612 configured for displaying the encoded images 114, 114', the third-party multimedia advertising content 111 and multimedia content file 112, 112', and the like. Display module 612 may comprise a software aspect, such as display software, including, but not limited to, video software, video drivers, graphic display software, or other software suitable to display information. In another embodiment, the display module 612 may comprise a hardware aspect, such as display hardware, including, but not limited to, a video graphics card, a computer monitor, a projector, a television, other forms of viewing screens, or other hardware suitable to display computer data. In yet another embodiment, the display module 612 may comprise both hardware and software aspects, such as those described directly above and elsewhere throughout the present disclosure.

In one embodiment, system 600 further comprises of a network module 614 to access a computer network 124. In one embodiment, the network module 614 is operative to access a closed computer network 124, such as a local area network, a dial-up network, or another form of closed computer network. In another embodiment, the network module 614 is operative to access an open computer network 124, such as a world-wide-web, or any other form of open computer network. In one embodiment, the network module 614 may comprise a software aspect, such as network software, including, but not limited to, networking software such as those produced by CISCO SYSTEMS®, SUN MICROSYSTEMS®, and ORACLE®. In another embodiment, the network module 614 may comprise a hardware aspect, such as network hardware, including, but not limited to, a network adapter, a wireless network adapter, a modem, and other hardware capable of accessing and/or communicating through a network. In yet another embodiment, the network module 614 may comprise both hardware and software modules, such as those described directly above and elsewhere throughout the present disclosure.

System 600 further comprises of a web browser module 616 operative to transmit, locate, retrieve and/or receive over the Internet information linked to the icon 128. In one embodiment, web browser module 604 may comprise a software aspect, such as a computer program, including, but not limited to, MICROSOFT INTERNET EXPLORER®, NETSCAPE NAVIGATOR®, OPERA®, MOSAIC®, SAFARI®, CHROME®, or any other form of computer software or program capable of browsing a computer network 138, such as the world-wide-web. In another embodiment, web browser module 616 may comprise a hardware aspect, such as a personal computer, including but not limited to, a web pc, a laptop, an internet station, a personal digital assistant, a smart phone, and the like. In yet another embodiment, web browser module 616 may comprise both hardware and software aspects, such as those described directly above and elsewhere throughout the present disclosure.

Methods

Figure 7:
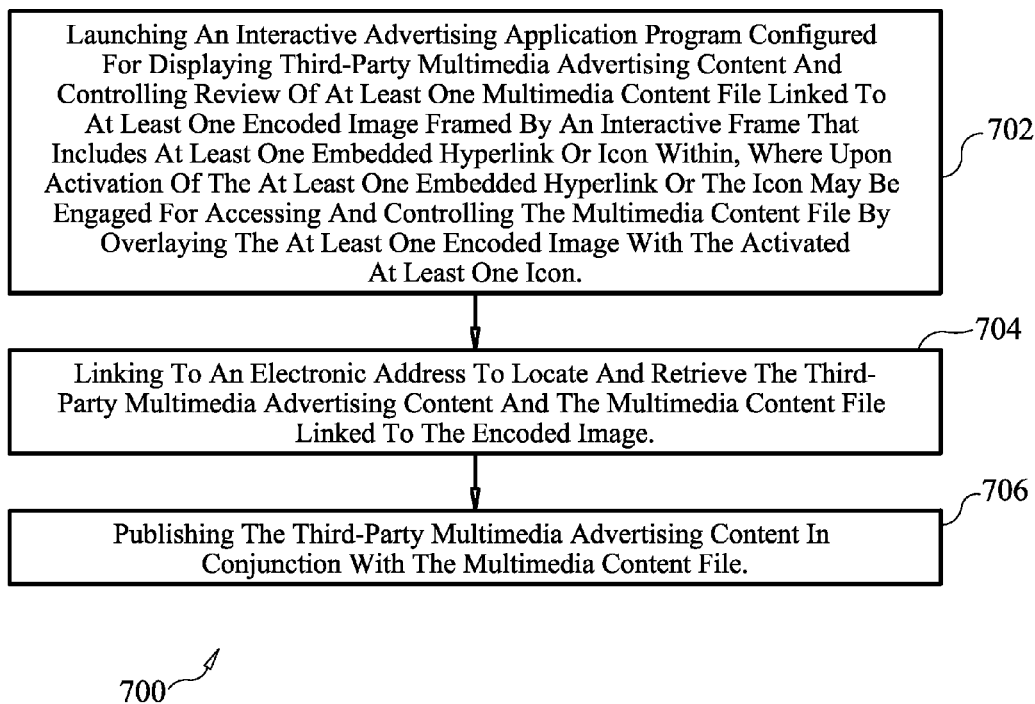
FIG. 7 is an exemplary method of the invention according to another embodiment.

FIG. 7 is an exemplary method 700 of the invention according to one embodiment. Method 700 comprises of launching an interactive advertising application program 110 configured for displaying third-party multimedia advertising content 111 for controlling review of at least one multimedia content file 112 linked to at least one encoded image 114 framed by an interactive frame 116 that includes at least one or more hot corners 118, 120, 122, 124 with at least one or more hyperlinks 126, 126' or icon 128, 128' embedded within, where upon activation of the at least one embedded hyperlink 126 or icon 128 it may be engaged for accessing and controlling the multimedia content file 112 by overlaying the at least one encoded image 114 with the activated at least one icon 128 (step 702).

The interactive advertising app 110 may comprise in part of a browser, such as for use on the mobile device 102, or a similar browsing device. Interactive advertising app 110 may be any type of software application, such as a stand-alone application designed to run on a mobile platform, such as a mobile device running an operating system 152, such as iOS™, Android™, Windows Mobile™, Blackberry™, and the like. Interactive advertising app 110 may be operative for an iPhone, any other "smart phone," mobile device, cellular phone, PDA, GPS or any other mobile device 102 capable of handling electronic transactions dealing with dynamic content, object, application, or software. In some embodiments, the interactive advertising app 110 may be designed to run on a social network platform, such as FACEBOOK® or JUSTSYNC®. In some embodiments, interactive advertising app 110 may reside on a server computer 140 and may be downloadable from the server computer 140 or otherwise reside in the mobile device's local memory means 106. In one embodiment, the interactive advertising app 110 may be on a mobile device 102 and the full-sized software program may be on a server computer 138, where communications may occur over a network or directly, either wired or wirelessly. As such the user may use his/her smart mobile device 102 to interact with the encoded image 114.

Method 700 further comprises linking to an electronic address to locate and retrieve the third-party multimedia advertising content 111 and the multimedia content file 112 linked to the encoded image 114 framed by an interactive frame 116 (step 704). Method 700 further comprises publishing the third-party multimedia advertising content 111 in conjunction with the multimedia content file 112 (step 706) and deriving revenue for the publication of the third-party multimedia advertising content 111 that is linked to the multimedia content file 112.

In some embodiments method 700 further comprises receiving at least one control command 130 for scanning the at least one encoded image 114 within the interactive frame 116 for which the interactive advertising app 110 is configured for communicating with the mobile device's processor 104 that is in electronic communication with the mobile device's image capturing means 132 and scanning the at least one encoded image 114 within the interactive frame 116 with the at least one hyperlink 126 or icon 128 embedded within. As previously discussed, the correlating at least one multimedia content file 112 may be viewed immediately or the at least one encoded image 114 may be stored for later review. Once the image capturing means 132 scans the at least one encoded image 114 within the interactive frame 116, the interactive advertising app 110 activates the at least one or more hot corners 118, 120, 122, 124 and its respective icons 128, 128', 128", 128'" for controlling the corresponding multimedia content file 112. The activated icons 128, 128', 128", 128'" in the hot corners 118, 120, 122, 124 may pulsate, blink or be displayed with a color contrast or in animation thereby alerting the user of the option to interact with the encoded image 114 by exploring one or more of the interactive icons 128, 128' with corresponding control commands 130, 130'. In some embodiments, the control commands 130, 130' are also visibly displayed as the hot corners 118, 120, 122, 124 are activated while in other embodiments the control commands 130, 130' only become visible as the icon 128 is being engaged.

Method 700 further comprises receiving a control command 130 to control the multimedia content file 112 when the at least one icon 128 from an activated hot corner 118 overlays the at least one encoded image 114 as the user drags the icon 128 to the designated area 150. Method 700 further comprises controlling the at least one multimedia content file 112, correlating to at least one encoded image 114 that includes an embedded hyperlink 126 or an icon 128, responsive to the control command. Multimedia content file 112 as used herein includes any one or more of the following: videos, promotions, coupons, coupon codes, bar codes, discounts, pricing, availability, store locations, directions, television commercials, radio advertisements, print advertisements, movies, and movie trailers and the like.

In some embodiments, the step of receiving a control command 130 includes receiving a control command 130 for displaying the at least one multimedia content file 112 within the interactive frame 114. As such, method 700 further comprises displaying the at least one multimedia content file 112 within the interactive frame 114 with full functionality for review and control commands 130, 130', including any one or more of the following: play, stop, fast-forward, rewind, pause, maximize viewing, minimize, and cancel and the like.

In some embodiments, the step of receiving a control command 130 includes receiving a control command 130 for any one or more of the following: displaying any promotions 302, e.g. coupons 302, 302' or product details 306 for a featured or related product shown in the encoded image 114 within the interactive frame 116. In other embodiments, the step of receiving a control command 130 includes receiving a control command 130 for locating stores 402, 402' for example the featured product in the encoded image 114 or generating and/or publishing directions 144 to for example the store locations that may be published in audio, map or listing of turn by turn directions 144.

Accordingly method 700 further comprises displaying any promotions 302, 302', e.g. coupons 302, 302' or product details 306 for a featured or related product shown in the encoded image 114 within the interactive frame 116 wherein the barcode 304 and or the coupon 302 displayed is available for use in brick and mortar stores or e-commerce. Product details 306 may also be published in audio or pictorial format and wherein user may utilize radio button 204, 206' to make product purchases.

Method 700 further comprises locating stores 402, 402' for example the stores 402, 402' selling the featured or a related product as shown in the encoded image 114 by linking to for example the advertiser's website or another search engine to locate the requested directions 144. In some embodiments, the interactive advertising app 110 may employ the map generator for the mobile device 102 to seek the requested directions 144 that will be published within the interactive frame 116. The interactive advertising app 110 is also configured for generating and/or publishing directions 144 to for example the stores' 402, 402' locations that may be published in audio, map or listing of turn by turn directions 144.

Figure 8:
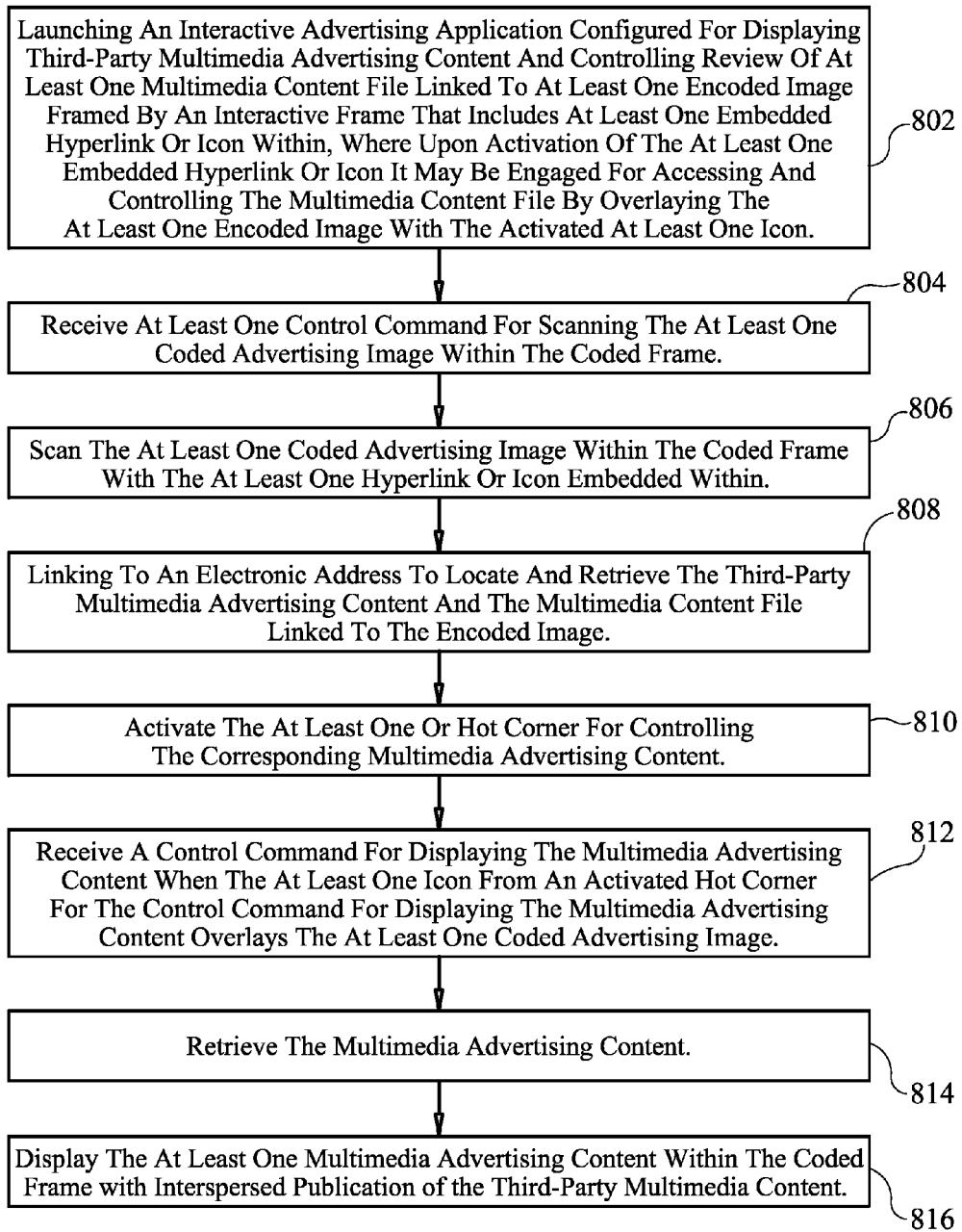
FIG. 8 is an exemplary method of the invention according to another embodiment.

FIG. 8 is an exemplary method 800 of the invention according to one embodiment. Method 800 comprises of launching an interactive advertising application program 110 configured for displaying third-party multimedia advertising content 111 for controlling review of at least one multimedia content file 112 linked to at least one encoded image 114 framed by an interactive frame 116 that includes at least one or more hot corners 118, 120, 122, 124 with at least one or more hyperlinks 126, 126' or icon 128, 128' embedded within, where upon activation of the at least one embedded hyperlink 126 or icon 128 it may be engaged for accessing and controlling the multimedia content file 112 by overlaying the at least one encoded image 114 with the activated at least one icon 128 (step 802). Method 800 further comprises receiving at least one control command 130 for scanning the at least one encoded image 114 within the interactive frame 116 (step 804) for which the mobile device's image capturing means 132 scans the at least one encoded image 114 within the interactive frame 116 with the at least one hyperlink 126 or icon 128 embedded within (step 806).

Method 800 further comprises the interactive advertising app 110 activating the at least one or more hot corners 118, 120, 122, 124 and its respective icons 128, 128', 128'', 128''' for controlling the corresponding multimedia content file 112 (step 808). If the user wants to display the multimedia content file 112 and selected the icon 128 for the control command 130 for displaying the multimedia content file 112. As such, method 800 comprises receiving a control command 130 for displaying the multimedia content file 112 when the at least one icon 128 from an activated hot corner 118 for the control command 130 for displaying the multimedia content file 112 overlays the at least one encoded image 114 (step 810) as the user drags the icon 128 to the designated area 150.

Method 800 comprises retrieving the multimedia content file 112 (step 812) by hyperlinking to an advertiser's website via its web address or searching the mobile device's memory means 106. Once the at least one multimedia content file 112 is retrieved, it is ready for display. Accordingly, method 800 comprises displaying the at least one multimedia content file 112 within the interactive frame 116 with interspersed publication of the third-party multimedia content 111 (step 814) on the mobile communication's displaying means 136 or the billboard 146 with full functionality for review and control using control commands 130, 130'. As previously discussed, control commands 122, 122' include but are not limited to any one or more of the following: play, stop, fast-forward, rewind, pause, maximize viewing, minimize, stop and cancel.

Figure 9:
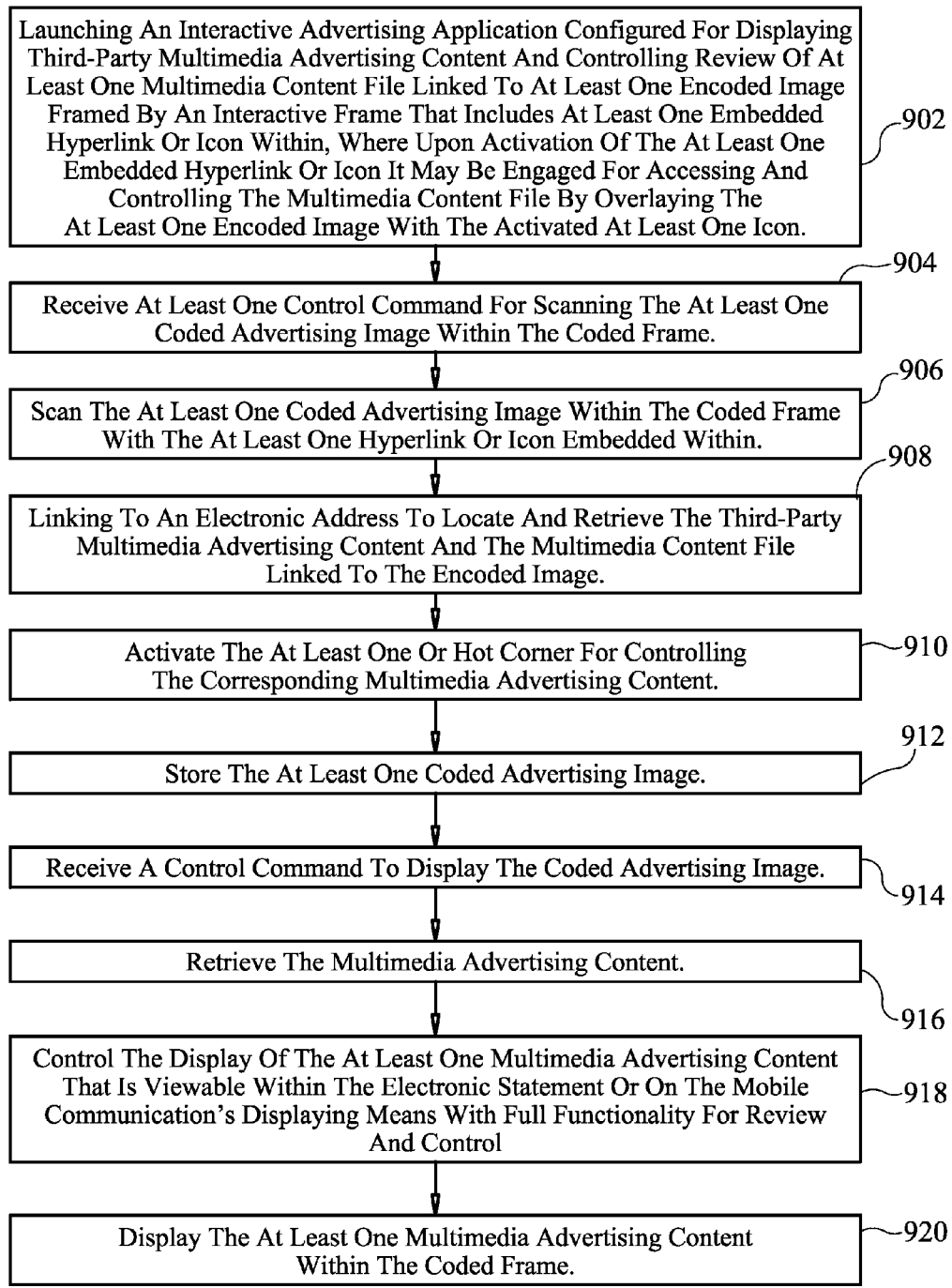
FIG. 9 is an exemplary method of the invention according to another embodiment.

FIG. 9 is an exemplary method 900 of the invention according to one embodiment, e.g. capturing the encoded image 114 for later review of the multimedia content file 112 according to the steps of 902-910, which are identical to steps 802-810.

Method 900 further comprises storing the at least one encoded image 114 (step 912) within the interactive frame 116 that includes at least one or more embedded hyperlinks 126, 126' or an icons 128, 128' on the mobile device's memory means 106 for later review. The captured encoded images 114, 114' are stored in an electronic folder 142 from which user has control over which encoded images 114, 114' are retained, when and which to delete and/or retrieve for review of the corresponding multimedia content file 112 to be displayed within the interactive frame 116. User may also email the encoded images 114, 114' as he/she chooses.

At the user's leisure, user may want to recall the at least one encoded image 114, for which method 900 comprises the interactive advertising app 110 receiving a control command 130 to display the encoded image 114 (step 914) where the interactive advertising app 110 retrieves the multimedia content file 112 (step 916) from the mobile device's memory means 106, the advertiser's website or from the Internet 138. Once the at least one multimedia content file 112 is retrieved, it is ready for display. Accordingly, method 900 comprises controlling the display of the at least one multimedia content file 112 with full functionality for review and control (step 918) using control commands 122, 122'. Method 900 comprises displaying the at least one multimedia content file 112 within the interactive frame 116 (step 920) on the mobile communication's displaying means 136. The multimedia content file 112 may be displayed in any one or more of the following formats: audio, video, pictorial, graphical or text format.

Advertisers are generally very interested in tracking the effectiveness of placed advertisements, e.g. which encoded image 114 was uploaded and/or how many times the multimedia content file 112 was reviewed whether reviewed on the mobile communication's displaying means 136 or the printed statement 148. In either event, method 700 comprises capturing statistical information for the at least one multimedia content file 124 that was viewed or the coded advertisement image 114 as uploaded and providing reports based on the captured statistical information.

Hardware and Operating Environment

This section provides an overview of example hardware and the operating environments in conjunction with which embodiments of the inventive subject matter can be implemented.

A software program may be launched from a computer readable medium in computer-based systems 100-600 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 10:
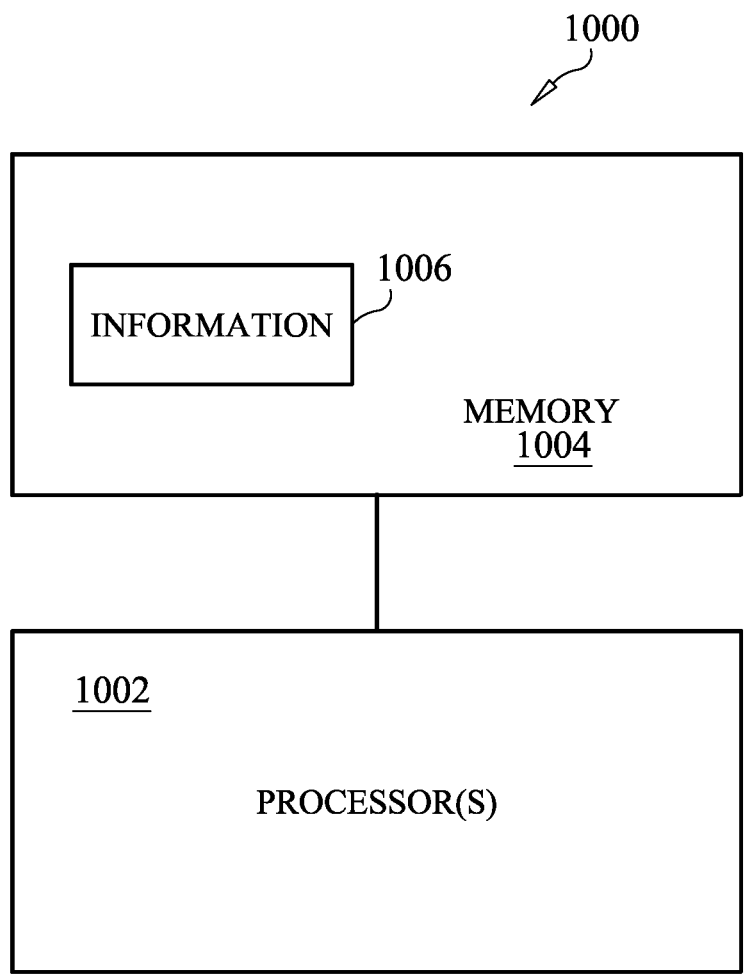
FIG. 10 is a block diagram representing an apparatus according to various embodiments.

FIG. 10 is a block diagram representing an apparatus 1000 according to various embodiments. Such embodiments may comprise a computer, a memory system, a magnetic or optical disk, some other storage device, or any type of electronic device or system. The apparatus 1000 may include one or more processor(s) 1004 coupled to a machine-accessible medium such as a memory 1002 (e.g., a memory including electrical, optical, or electromagnetic elements). The medium may contain associated information 1004 (e.g., computer program instructions, data, or both) which, when accessed, results in a machine (e.g., the processor(s) 1004) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
   a mobile device that includes a computer processor in electronic communication with memory means;
   computer executable instructions, executable by the mobile device's computer processor, which launches an interactive advertising application that displays third-party multimedia advertising content and controls review of at least one multimedia content file linked to at least one encoded image framed by an interactive frame, wherein the frame includes at least one embedded hyperlink or icon within;
   image capturing means that scans the at least one encoded image within the interactive frame causing the at least one embedded hyperlink or icon to be activated, and upon activation, an activated icon can be engaged for accessing and controlling the multimedia content file by overlaying the at least one encoded image with the activated at least one icon;
   communication means that retrieves the third-party multimedia advertising content linked to the at least one multimedia content file that is linked to at least one encoded image framed by an interactive frame; and
   displaying means that displays the third-party multimedia advertising content upon the scanning of the at least one encoded image in conjunction with displaying the at least one multimedia content file linked to the captured at least one encoded image within the interactive frame.

2. The system of claim 1, wherein the at least one multimedia content file includes any one or more of the following: videos, promotions, coupons, coupon codes, bar codes, discounts, pricing, availability, store locations, directions, television commercials, radio advertisements, print advertisements, movies, and movie trailers.

3. The system of claim 1, wherein at least one control command associated with the at least one embedded icon includes any one of the following: display multimedia content file, display promotions for featured product, display product details, locate stores, and generate directions.

4. The system of claim 1, wherein the interactive advertising application displays the at least one multimedia content file that is reviewed and controlled using at least one control command.

5. The system of claim 4, wherein the at least one control command for displaying the at least one multimedia content file includes any one or more of the following: play, stop, fast-forward, rewind, pause, maximize viewing, minimize, end and cancel.

6. The system of claim 1, wherein the interactive advertising application derives revenue for the publication of the third-party multimedia advertising content file that is linked to the multimedia content file.

7. The system of claim 1, wherein the interactive advertising application retrieves the third-party multimedia advertising content and the at least one multimedia content file linked to at least one encoded image by linking to a web address.

8. The system of claim 1, wherein the at least one encoded image framed by the interactive frame is displayed on electronic media, or a printed statement that includes any one of: a business card, a menu, a program, a printed billboard advertisement, a printed article, magazine page, newspaper insert, and an advertising card.

9. The system of claim 1, wherein the interactive advertising application provides for product purchases related to the encoded image.

10. The system of claim 1, wherein the interactive advertising application stores a plurality of captured encoded images within an electronic folder.

11. A method comprising of:
    launching an interactive advertising application program that displays third-party multimedia advertising content and controls review of at least one multimedia content file linked to at least one encoded image framed by an interactive frame, wherein the frame includes at least one embedded hyperlink or icon within that is activated when image capturing means scans the at least one encoded image, and upon activation an activated icon can be engaged for accessing and controlling the multimedia content file by overlaying the at least one encoded image with the activated at least one icon;
    linking to an electronic address to locate and retrieve the third-party multimedia advertising content and the multimedia content file linked to the encoded image;
    publishing the third-party multimedia advertising content in conjunction with the multimedia content file.

12. The method of claim 11, further comprising:
    receiving at least one control command to scan the at least one encoded image within the interactive frame;
    scanning the at least one encoded image within the interactive frame with the at least one embedded hyperlink or icon within;
    activating the at least one or hot corner to control the corresponding multimedia content file;
    receiving a control command to control the multimedia content file when the at least icon from an activated hot corner overlays the at least one encoded image; and
    controlling the at least one multimedia content file correlating to at least one encoded image responsive to the control command.

13. The method of claim 11, wherein the at least one multimedia content file includes any one or more of the following: videos, promotions, coupons, coupon codes, bar codes, discounts, pricing, availability, store locations, directions, television commercials, radio advertisements, print advertisements, movies, and movie trailers.

14. The method of claim 11, further comprising displaying the at least one multimedia content file that is reviewed and controlled using at least one control command.

15. The method of claim 14, wherein the review and control commands include any one or more of the following: play, stop, fast-forward, rewind, pause, maximize viewing, minimize, and cancel.

16. The method of claim 11, further comprising displaying any one of the following: promotions or product details for a featured product in the encoded image within the interactive frame.

17. The method of claim 11, further comprising deriving revenue for the publication of the third-party multimedia advertising content file that is linked to the multimedia content file.

18. The method of claim 11, wherein the interactive advertising application stores the at least one encoded image within an electronic folder.

19. The method of claim 11, wherein the interactive advertising application retrieves the at least one multimedia content file for displaying on a mobile communication device's displaying means or an electronic statement.

20. The method of claim 11, wherein the step of retrieving the at least one multimedia content file further comprises retrieving the at least one encoded image from any one of the following: the mobile device's memory means, hyperlinking to an advertiser's website via its web address, or hyperlinking to the application's memory means.

21. The method of claim 11, wherein the at least one encoded image framed by the interactive frame is displayed on electronic media, or a printed statement that includes any one of: a business card, a menu, a program, a printed billboard advertisement, a printed article, magazine page, newspaper insert, and an advertising card.

22. The method of claim 11, further comprising capturing statistical information for the at least one multimedia content file that was viewed and providing reports.

\* \* \* \* \*